(12) United States Patent
Gaydos (10) Patent No.: US 8,319,660 B2
(45) Date of Patent: Nov. 27, 2012

(54) SYSTEM AND RELATED METHOD FOR VISUALLY INDICATING A CONDITION OF A LOCK ON A RAILROAD HOPPER CAR

(75) Inventor: Christopher C. Gaydos, Hampshire, IL (US)

(73) Assignee: Miner Enterprises, Inc., Geneva, IL (US)

( * ) Notice: Subject to any disclaimer, the term of this patent is extended or adjusted under 35 U.S.C. 154(b) by 653 days.

(21) Appl. No.: 12/462,382

(22) Filed: Aug. 3, 2009

(65) Prior Publication Data

US 2011/0025481 A1  Feb. 3, 2011

(51) Int. Cl.
*B61D 3/00* (2006.01)

(52) U.S. Cl. ..... 340/901; 105/253; 105/286; 105/308.1; 105/310; 105/313; 246/191; 340/425.5; 340/426.28; 340/540

(58) Field of Classification Search .......... 340/431, 340/901, 933, 425.5, 426.1, 426.28, 500, 340/540; 70/57; 246/191; 105/247, 253, 105/280, 286, 289, 290, 296, 304, 301, 308.1, 105/308.2, 310, 313
See application file for complete search history.

(56) References Cited

U.S. PATENT DOCUMENTS

| | | | | |
|---|---|---|---|---|
| 4,366,757 A * | 1/1983 | Funk | | 105/248 |
| 6,019,049 A | 2/2000 | Gaydos et al. | | |
| 6,227,124 B1 * | 5/2001 | Gaydos et al. | | 105/286 |
| 6,279,487 B1 | 8/2001 | Gaydos et al. | | |
| 6,431,084 B1 | 8/2002 | Gaydos | | |
| 6,604,469 B1 | 8/2003 | Galvan | | |
| 6,637,346 B2 | 10/2003 | Gaydos | | |
| 7,493,865 B2 | 2/2009 | Galvan | | |
| 2003/0183697 A1 * | 10/2003 | Porter | | 235/492 |
| 2004/0156213 A1 * | 8/2004 | Lodhie | | 362/555 |
| 2006/0032396 A1 * | 2/2006 | Herzog et al. | | 105/10 |
| 2006/0042500 A1 * | 3/2006 | Taylor | | 105/286 |
| 2007/0079726 A1 * | 4/2007 | Creighton et al. | | 105/247 |
| 2010/0251923 A1 * | 10/2010 | Forbes et al. | | 105/253 |

* cited by examiner

*Primary Examiner* — Brent Swarthout
(74) *Attorney, Agent, or Firm* — Law Office of John W. Harbst (57) ABSTRACT

A system on a railroad hopper car for providing an indication, observable by a person located either proximate to or remote from the hopper car, of a condition of a lock arranged in operable combination with a mechanism on the hopper car for controlling discharge of material from the hopper car. The system includes electric circuitry and a sensor for providing a signal when each discharge mechanism lock on the railcar is in the locked condition and for producing another signal when each discharge mechanism lock on the railcar is in the unlocked condition. An illuminable indicator, mountable on a side of the railroad hopper car, is responsive to signals from the circuitry for displaying the condition of the discharge mechanism locks. A method for visually displaying a condition of a lock on a railroad hopper car as through use of illumination is also disclosed.

32 Claims, 8 Drawing Sheets

SYSTEM AND RELATED METHOD FOR VISUALLY INDICATING A CONDITION OF A LOCK ON A RAILROAD HOPPER CAR

FIELD OF THE INVENTION DISCLOSURE

This invention disclosure generally relates to railroad hopper car and, more particularly, to a system and related method for indicating the condition of a lock on a railroad hopper car.

BACKGROUND

Conventional railroad hopper cars include a multisided hopper having a series of openings provided on an underside of the car. Such railcars are used to economically transport a large variety of commodities including corn, sugar, wheat, aggregate, iron ore, coal and, etc. which are hereinafter commonly referred to as "material", between distantly spaced locations. As will be appreciated, each hopper car serves a particular need in the railcar industry.

Although the design of railroad hopper cars can vary considerably between manufacturers, the railcar hopper is typically provided with a plurality of longitudinally spaced chutes. At a lower end, each chute has a discharge opening through which material is discharged or exhausted from the car.

A mechanism is carried by the hopper in registry with each discharge opening to control the discharge of material therefrom. The particular style or type of mechanism arranged in operable association with each discharge opening can also vary between manufacturers and depends, in part, on the particular material carried by the hopper car. Generally, each mechanism includes an element movable between closed and open positions for controlling the material flow from the hopper car. In some applications, the element on each mechanism is operated under the influence of a powered driver to move between closed and open positions. In other applications, the element on each mechanism is manually moved between closed and open positions.

As the railroad hopper car moves between locations it is continually subjected to vibrations and other movements which can cause the element on the discharge mechanism to inadvertently move from the closed position toward an open position. Moreover, in railyards, the hopper cars are subjected to humping against other railcars during assembly of a train consist. These humping actions can also cause the element on the discharge mechanism to inadvertently move from a closed position toward the open position. Of course, inadvertent movement of the element on the discharge mechanism toward the open position can result in the loss of a significant amount of material from the hopper car during transport between locations.

Accordingly, most of today's railcars are equipped with some type of lock arranged in operable combination with the mechanism used to discharge material from the hopper car. Generally, such lock is operable in either a locked condition, wherein said lock maintains the element of the discharge mechanism in a closed position whereby inhibiting the discharge of material from the car, and an unlocked condition. Moreover, by maintaining the discharge element in a closed position, even if the hopper is empty, ensures the movable element on the discharge mechanism is kept out of "harms way" as the car is returned for reloading. When the lock is arranged in an unlocked condition, the lock permits the element of the discharge mechanism to be moved toward an open position whereby permitting the discharge of material from the hopper car. Of course, and depending upon the particular manufacturer, the lock design can also vary. Typically, however, the lock mechanism includes a member movable along a predetermined path of travel as the lock moves between conditions.

As will be appreciated, the condition of the lock on the discharge mechanism is an important concern. Mechanical indicators for showing the condition of the discharge mechanism lock currently use a form of linkage system. One problem which has been identified with such mechanical indicators relates to their reliability. That is, such mechanical indicators require an operator to interpret the condition of the lock based on the angular position of a pointer or the like relative a set location on the car. If the operator's interpretation is faulted, the car may be permitted to move with the discharge mechanism lock being in an unlocked condition. Another problem with such mechanical indicators involves their location on the car. Frequently, such mechanical indicators are arranged beneath the hopper on the railcar and are difficult to view especially remote from the car. Accordingly, an operator is required to view each lock independently from a position directly along side of the railcar and proximate the lock to accurately determine the condition of the lock. This is a time consuming and tedious process—but one which is heretofore required to interpret the condition of the lock. Of course, at night, known indicators using a mechanical linkage system are even more difficult to see and evaluate the condition of the lock.

Today's automated technology has lent itself to railroads and the ability to readily and easily assess various conditions on a railcar as it moves between locations. To accomplish these goals, however, requires more than a purely mechanical linkage system to provide the information necessary to evaluate certain conditions on the railcar.

Thus, there is a continuing need and desire for a system and related method for enhancing the ability to quickly and readily access the condition of a lock on a railroad hopper car.

SUMMARY

In view of the above, and in accordance with one aspect, there is provided, in combination, a railroad car with a hopper from which material can be discharged, a mechanism for controlling the discharge of material from the hopper, with the discharge including an element movable between closed and open positions, a lock arranged in operable combination with the mechanism, with the lock being operable in either a locked condition, wherein said lock maintains the element of said mechanism in the closed position whereby inhibiting discharge of material from the hopper, and an unlocked condition, wherein the lock permits the element of the discharge mechanism to be moved from the closed position toward the open position whereby permitting the discharge of material from the hopper, and wherein the lock includes a member movable in a predetermined path of travel as the lock moves between conditions, a system for visually indicating the condition of the lock. Such visual system includes an electrically powered illuminable indicator arranged on a side of the hopper for indicating whether said lock is in the locked condition or the unlocked condition and electric circuitry. The electric circuitry is connected to the illuminable indicator and includes sensor technology for monitoring the condition of the lock and for controlling the operation of the illuminable indicator as a result of signals from the sensor technology indicative of the condition of the lock.

In one form, the discharge mechanism on the railroad car can be operated by a powered driver to move the element of the mechanism between positions. In this form, the electric circuitry of the indicator system is preferably powered for a preset time after said the discharge mechanism is operated by the driver to move the element of the discharge mechanism. In one embodiment, the sensor technology includes a sensor mounted on the railroad car for monitoring movement of the lock member relative to a predetermined position and for providing a signal to the illuminable indicator when the lock member moves relative to the predetermined position.

A solar energy panel is preferably mounted on the railcar to power a battery connected to the illuminable indicator and the electric circuit of the indicator system. In one form, the illuminable indicator includes a light operable in either of two modes for indicating whether the lock is in the locked condition or the unlocked condition. In another form, the illuminable indicator includes two lights, with one light emitting illumination when the lock is in the locked condition, and with a second light emitting illumination when the lock in an unlocked condition. In a preferred form, a first color is emitted by the illuminable indicator when the one light is illuminated, and wherein a second color, different from the first color, is emitted by the illuminable indicator when the second light is illuminated.

According to another aspect, there is provided a system mounted on a railroad hopper car for providing a visual indication observable by a person located either proximate to or remote from the hopper car of a condition of a lock arranged in operable combination with a mechanism on the hopper car for controlling discharge of material from the hopper car. The discharge mechanism includes an element movable between closed and open positions. The lock includes a member movable in a predetermined path of travel as the lock moves between locked and unlocked conditions. Such system includes circuitry connected to a power source and including a sensor for providing a signal when the lock is in the locked condition, wherein the element of the discharge mechanism is maintained in the closed position, and for producing another signal when the lock is in the unlocked condition, wherein the movable element of the discharge mechanism is permitted to be moved to the open position. An illuminable indicator is mounted to a side of the railroad hopper car and is responsive to signals from said circuitry for displaying the condition of the lock viewable from a location proximate to or from a location remote from the railroad hopper car.

Preferably, the sensor is mounted on the railroad car for monitoring movement of the lock member relative to a predetermined position and for providing a signal to the illuminable indicator when the lock member moves relative to the predetermined position. In one form, the electrical power source connected to the electrical circuitry includes a solar energy panel mounted on the railroad hopper car.

In one embodiment, the movable element on the discharge mechanism is moved between closed and open positions by a powered driver. In this form, the electric circuitry of the system is preferably powered for a preset time after the driver of the discharge mechanism is operated to move the element of said mechanism. In a preferred embodiment, the system further includes logic circuitry for controlling the illuminable indicator to provide a visual indication of a fault with either the system, or the lock, or both.

In one form, the illuminable indicator includes a light operable in either of two modes for indicating whether the lock is in the locked condition or the unlocked condition. In another form, the illuminable indicator includes two lights, with one light emitting illumination when the lock is in the locked condition, and with a second light emitting illumination when the lock in the unlocked condition. Preferably, a first color is emitted by the illuminable indicator when the one light is illuminated, and wherein a second color, different from the first color, is emitted by the illuminable indicator when the second light is illuminated.

According to another aspect, there is provided a system mounted on a railroad hopper car for providing a visual indication observable by a person located either proximate to or remote from the hopper car of a condition of a lock arranged in operable combination with a mechanism on the hopper car for controlling discharge of material from the hopper car. The discharge mechanism includes an element movable between closed and open positions. The lock includes a member movable in a predetermined path of travel as the lock moves between locked and unlocked conditions. The system includes a sensor mounted on the hopper car for monitoring and detecting when the lock is in the locked condition, wherein the movable element of the discharge mechanism is maintained in the closed position, and for detecting when the lock is in the unlocked condition, wherein the movable element of the discharge mechanism is permitted to be moved to the open position and an electronically powered display. The display is mounted to a side of the railroad hopper car and controlled by the sensor wherein, the sensor, upon detecting the lock to be in the locked condition activates the display to visually indicate the lock to be in the locked condition and upon detecting the lock to be in the unlocked condition activates the display to indicate the lock is in the unlocked condition.

In one form, the sensor is mounted on the railcar for monitoring movement of the lock member relative to a predetermined position and for providing signals to the display when the lock member moves relative to the predetermined position. Preferably, a solar energy panel is mounted on the railcar and is connected to the sensor and the electronically powered display.

In one embodiment, the discharge mechanism on the railroad hopper car includes a powered driver which positively drives the movable element of the discharge mechanism the closed and open positions. In such embodiment, the electric circuitry of the system is preferably powered for a preset time after the driver on the discharge mechanism is operated to drive the movable element of the discharge mechanism between positions. In another form, the system further includes logic circuitry for controlling the display so as to provide a visual indication of a fault with either the system, or the lock, or both.

In one form, the display for the system includes a light operable in either of two modes for indicating whether the lock is in the locked condition or the unlocked condition. Alternatively, the display includes two lights, with one light emitting illumination when the lock is in the locked condition, and with a second light emitting illumination when the lock in the unlocked condition. Preferably, a first color is emitted by the display when one light is illuminated, and wherein a second color, different from the first color, is emitted by the display when the second light is illuminated.

According to yet another aspect, there is provided a method for visually indicating a condition of a lock on a railroad hopper car having multiple sides to a person located either proximate to or remote from the railroad hopper car. The lock is arranged in operable combination with a mechanism on the railroad hopper car for controlling discharge of material from the hopper car. Such mechanism includes an element movable between a closed position an open position. The lock includes a member movable in a predetermined path of travel as the lock moves between locked and unlocked conditions. The method includes the steps of: sensing whether the lock is in the locked condition, wherein the movable element of the discharge mechanism is maintained in the closed position, or in the unlocked condition. With the lock in the unlocked condition, the movable element of the discharge mechanism is permitted to be moved toward the open position. Another step in the method involves transmitting information relating to the condition of the lock. Yet another step in the method involves displaying information relating to the condition of the lock with an illuminable indicator mounted to a side of the railroad hopper car.

In one form, the discharge mechanism on the railroad car includes a powered driver to positively drive the movable element of the discharge mechanism between closed and open positions. In this form, the method further includes the step of: illuminating the indicator for a preset time after the powered driver on the discharge mechanism is operated to drive the movable element of the discharge mechanism between positions. In one form, the method further involves the step of: providing electrical power to the illuminable indicator from a solar energy panel mounted on the railroad car.

Preferably, the method can further include the step of: reading the information displayed by the illuminable indicator on the side of the railroad car. In another form, the method can further involve the step of: transmitting data to a location remote from the railroad hopper car based upon the sensed condition of the lock. Moreover, the method can involve the step of: using logic circuitry to control the illuminable indicator in a manner displaying a fault with either the lock or the sensor.

In one form, the illuminable indicator includes a light operable in either of two modes for indicating whether the lock is in the locked condition or the unlocked condition. Alternatively, the illuminable indicator includes two lights, with one light emitting illumination when the lock is in the locked condition, and with a second light emitting illumination when the lock in an unlocked condition. Preferably, a first color is emitted by the illuminable indicator when the one light is illuminated, and wherein a second color, different from said first color, is emitted by the illuminable indicator when the second light is illuminated.

DETAILED DESCRIPTION

While this invention disclosure is susceptible of embodiment in multiple forms, there is shown in the drawings and will hereinafter be described preferred embodiments, with the understanding the present disclosure sets forth exemplifications of the disclosure which are not intended to limit the disclosure to the specific embodiments illustrated and described.

Figures 1, 2:
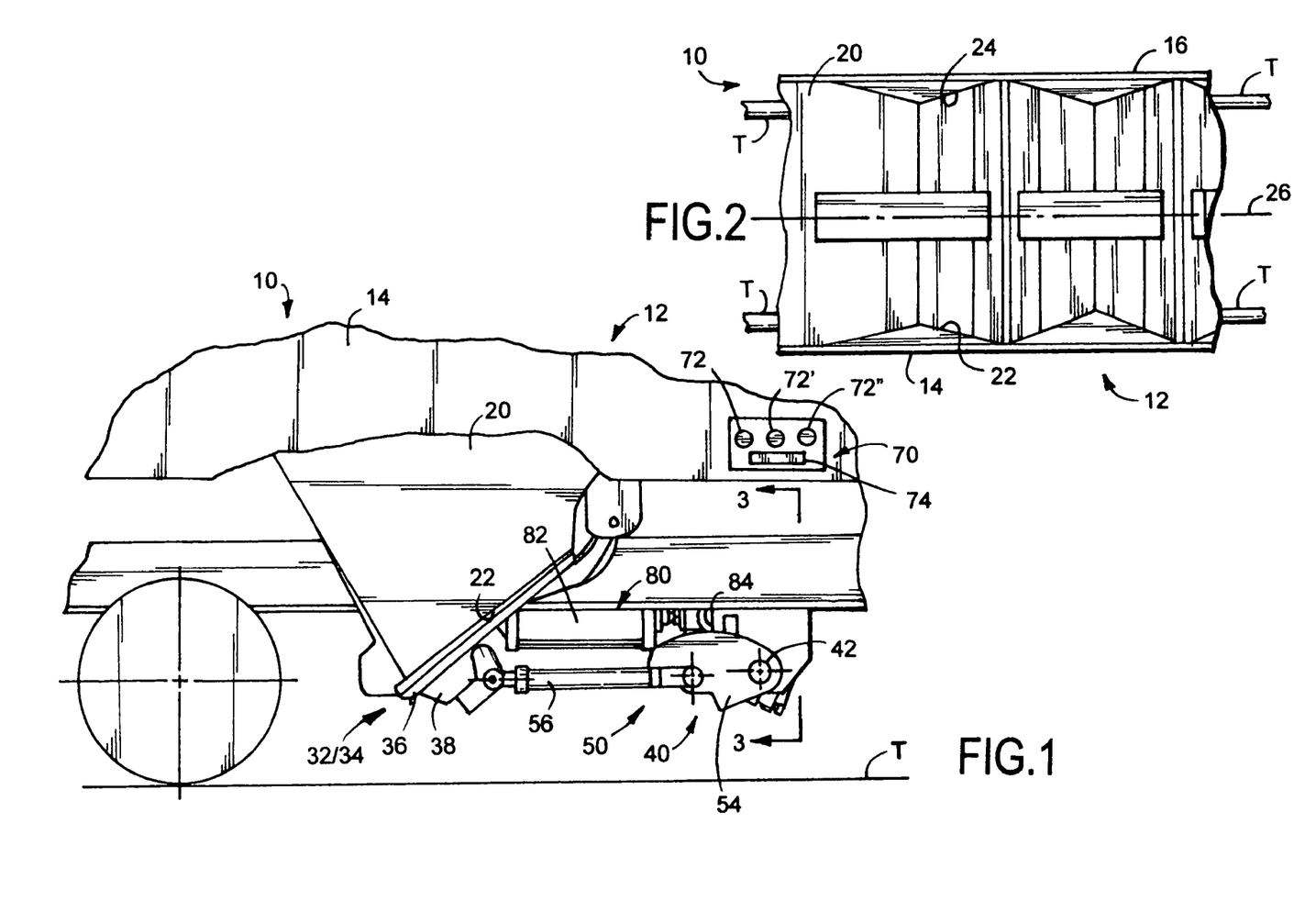
FIG. 1 is a fragmentary side elevational view, with parts broken away, of a railroad hopper car embodying principals of the present invention disclosure.
FIG. 2 is a fragmentary top plan view of the railroad hopper car illustrated in FIG. 1.

Referring now to the drawings, wherein like reference numerals indicate like parts throughout the several views, there is shown in FIGS. 1 and 2, a railroad hopper car, generally identified by reference numeral 10 which rides along tracks T. Although railroad hopper cars have a variety of configurations, they typically have a walled enclosure or hopper 12 for storing and transporting material therewithin. In the illustrated embodiment, hopper 12 has a pair of generally parallel sides 14 and 16 and opposed ends (not shown). In many configurations, hopper 12 has an open-top design, but the hopper could be closed, is so desired, with a conventional roof structure defining a central opening or trough and well known covers arranged to close such opening.

As mentioned, hopper 12 can take a variety of configurations. In the exemplary embodiment, hopper 12 is provided with a plurality of longitudinally spaced funnel-shaped chutes 20 (with only one being shown in FIG. 1) between the opposed ends of the hopper 12. In the hopper 12 shown in FIG. 2, each chute 20 defines a pair of discharge openings 22 and 24 arranged in general transverse alignment relative to each other on opposed sides of a longitudinal axis 26 of the car 10 and through which material is discharged from hopper 12. It should be appreciated, however, the teachings and principals of the present disclosure readily and equally lend themselves to railcar hoppers having different designs including differently designed discharge openings from that illustrated for exemplary purposes herein. Whereas, in differently designed hopper cars, material is discharged from the hopper 12 through a single discharge opening defined toward the bottom of each chute 20 on the hopper 12.

Figure 3:
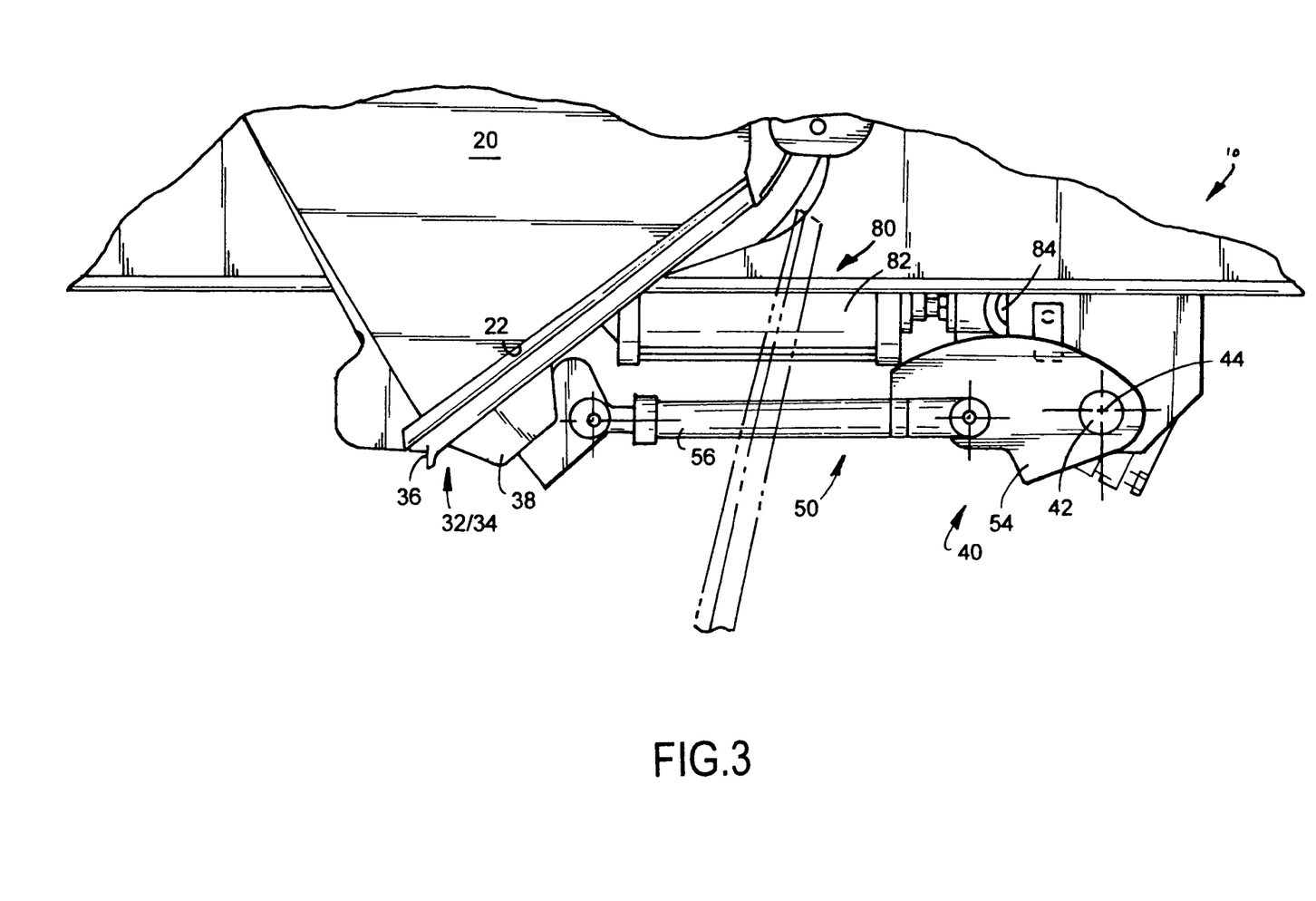
FIG. 3 is a fragmentary transverse sectional view taken along line 3-3 of FIG. 1.

Since each chute 20 on the hopper 12 includes a pair of discharge openings 22 and 24, in the embodiment shown in FIG. 3, a pair of transversely spaced and generally aligned discharge mechanisms 32 and 34 carried by hopper 12 are arranged in registry with the discharge openings 22 and 24, respectively, of each chute 20 to control the discharge of material from hopper 12. It should be appreciated, however, if each chute on the hopper 12 was provided with but a single discharge opening on each chute, a single discharge mechanism associated with each discharge opening can be used to control the discharge of material from the hopper 12.

In the exemplary form shown, the discharge mechanisms 32 and 34 are substantially identical to each other. Each discharge mechanism 32, 34 includes a element 36 which moves between closed and open positions relative to the respective discharge opening in hopper 12. In one form, a transversely elongated cross-bar or connector 38 (FIG. 1) couples the discharge elements 36 of the discharge mechanisms 32 and 34 to each other. As such, and in the embodiment illustrated for exemplary purposes, the movable element 36 of discharge mechanism 32 will move simultaneously between closed and open positions with the movable element 36 of discharge mechanism 32 and vice versa. Accordingly, and although they are associated with separate openings 22 and 24, the discharge mechanisms 32 and 34 operate in unison relative to each other and as a single discharge mechanism. A fuller description of the particulars of the each discharge mechanism is set forth in coassigned U.S. Pat. No. 7,493,865; the applicable portions of which are incorporated herein by reference.

As explained in fuller detail in the above-identified U.S. patent, an apparatus 40 is provided for selectively controlling discharge of commodity from each hopper chute 20. Preferably, each control apparatus 40, operably associated with the discharge mechanisms on the hopper 12 is substantially identical. Thus, only one control apparatus will be described in detail. Each control apparatus 40 preferably permits either manual operation or powered movement of the element 36 for each discharge mechanism between closed and open positions.

Figure 4:
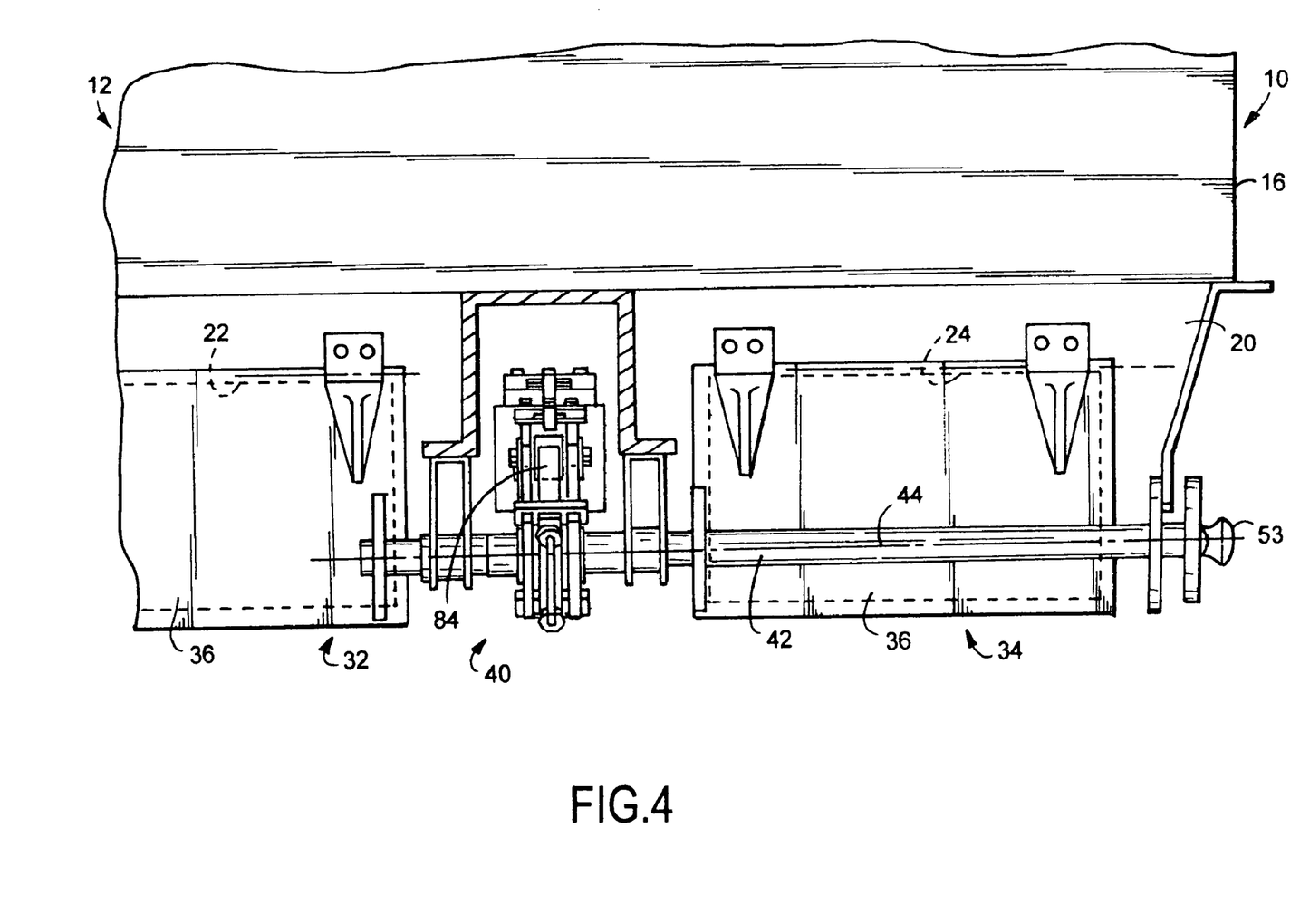
FIG. 4 is an enlarged fragmentary side view of a railroad hopper car embodying principals of the present invention disclosure.

Like the discharge mechanisms on the car 10, the design of the control apparatus 40 can change and vary depending upon the particular application. In the embodiment shown in FIGS. 3 and 4, control apparatus 40 includes an elongated operating shaft 42 mounted on the hopper 12 for rotation about a fixed and generally horizontal axis 44. As shown in FIG. 4, the operating shaft 42 is operably connected to the movable discharge elements 36 through a linkage system 50. Toward a first end, linkage system 50 is operably connected to the operating shaft 42. Toward a second end, the linkage system 50 is operably connected to the connector 38 thereby operating the discharge mechanisms associated with each chute 20 on the hopper car 10 in unison relative to each other.

In the particular form shown in FIG. 4, linkage system 50 includes articulately interconnected links 54 and 56. Link 54 is preferably configured as a lever which radially extends away from the axis 44 and is nonrotatably secured or operably connected to rotate with operating shaft 42. As shown, link 56 is preferably configured as an elongated connector articulately joined toward one end to a location on lever 54 radially spaced from the axis 44 about which shaft 42 rotates. Link 56 is articulately connected toward an opposed end to the crossbar or connector 38 joining the movable element 36 of each discharge mechanism 32, 34.

In the embodiment illustrated for exemplary purposes, the links 54, 56 and their connections to the discharge mechanisms 32, 34, to each other, and relative to axis 44 of shaft 42 are arranged in an overcenter linkage design serving as a lock for the discharge mechanisms 32, 34. As will be appreciated, the lock can be conditioned in a first or locked condition, whereby positively maintaining the movable element 36 of each discharge mechanism in their closed position, or a second or unlocked condition. In the unlocked condition, the lock permits the movable element 36 of each discharge mechanism to be moved from the closed position toward an open position. In the illustrated embodiment, the connection between lever 54 and link 56 is required to move overcenter when the movable element 36 of each discharge mechanism is purposefully moved from the closed toward the open position.

Figure 5:
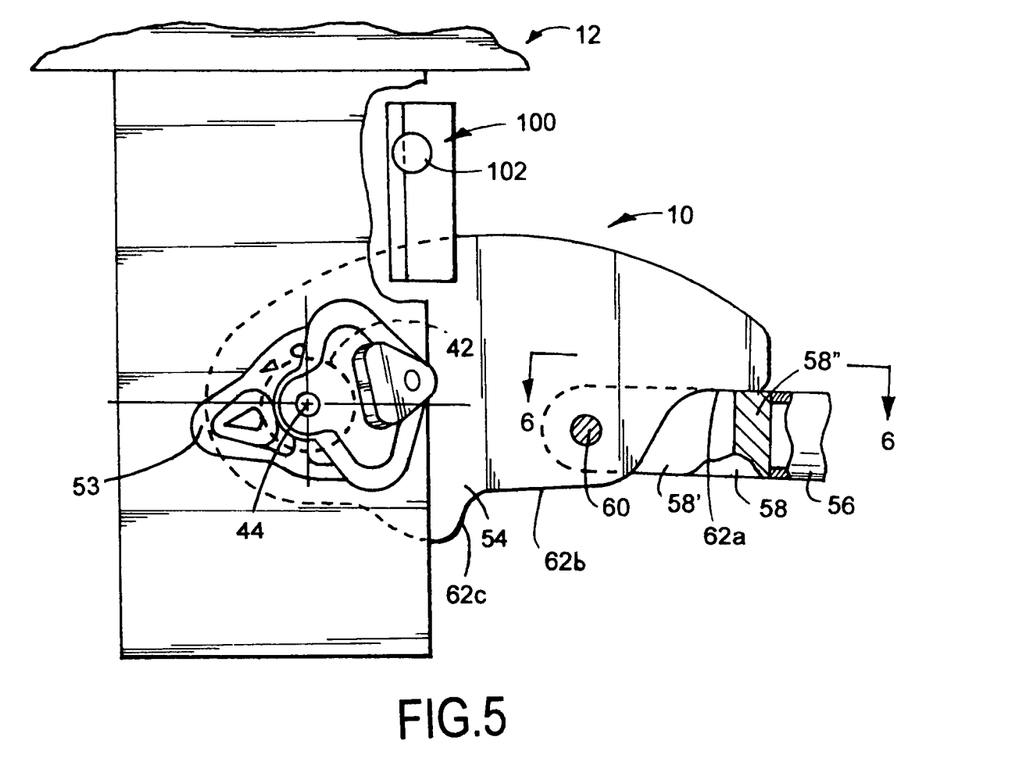
FIG. 5 is a top plan view taken along line 5-5 of FIG. 6
Figure 6:
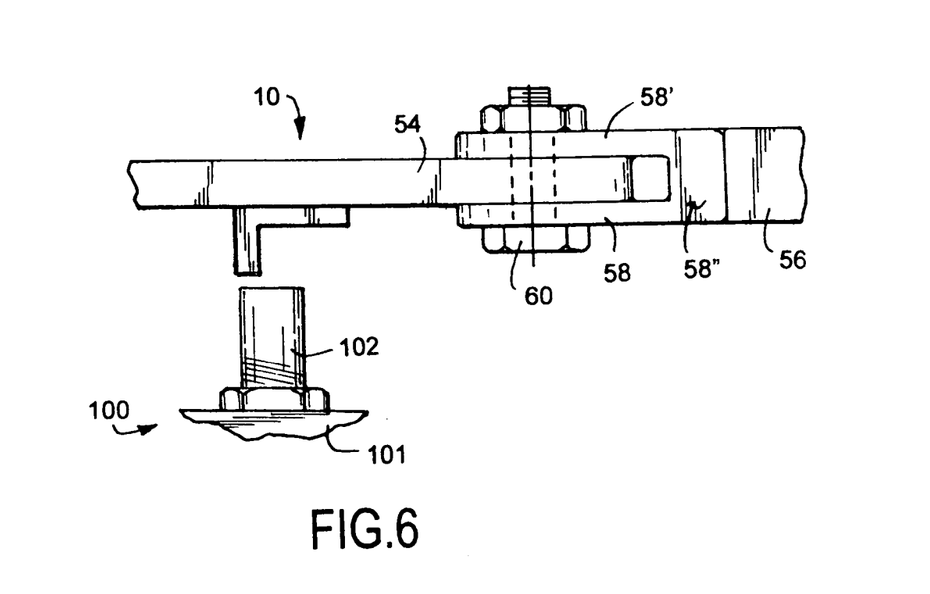
FIGS. 6 and 7 are enlarged fragmentary right side views of a portion of a control apparatus embodying principals of the present invention disclosure in different operating conditions.

In the example shown in FIGS. 5 and 6, lever 54 is movable in a predetermined path of travel as the lock moves between locked and unlocked conditions. Moreover, and in the exemplary embodiment illustrated in FIGS. 5 and 6, the end of link 56 connected to lever 54 is preferably provided with a clevis-like configuration including a pair of parallel arms 58, 58' which embrace a portion of lever 54 therebetween and which are joined by a bight portion 58". A suitable connector 60, such as a conventional bolt or pin, passes endwise through the arms 58, 58' and through the lever or link 54 to operably and articulately interconnect lever 54 to link 56 at a distance radially spaced from the axis 44 of rotation of shaft 42.

Figure 7:
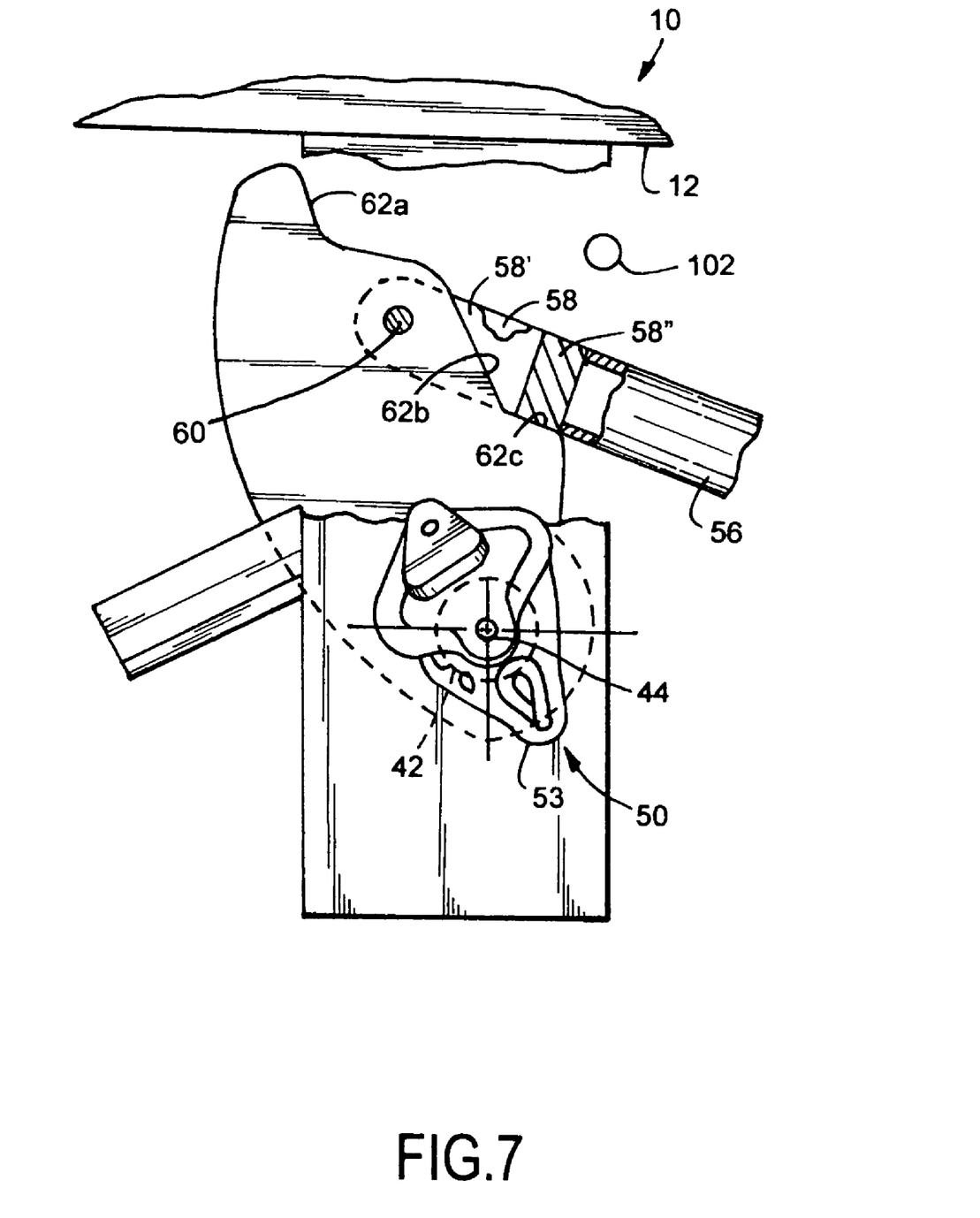

In the embodiment illustrated in FIGS. 5 and 7, lever 54 has a peripheral edge, significant portions of which are identified as 62a through 62c. To move element 36 (FIG. 2) of each discharge mechanism into their closed positions, the operating shaft 42 is rotated from the position shown in FIG. 7 and in a clockwise direction toward the position shown in FIG. 5 with lever 54 moving therewith in a clockwise direction. As will be appreciated from FIG. 6, rotation of shaft 42 in a clockwise direction continues until edge portion 62a of lever 54 engages portion 58" of the clevis-like configuration at the end of link 56. As such, further rotation of the lever 54 and, thus, shaft 42 is stopped or prevented by the abutting relationship between edge portion 62a of lever 54 against the clevis-like configuration at the end of link 56. Notably, edge portion 62a of lever 54 is preferably configured such that when abutment occurs between edge portion 62a and the clevis-like configuration at the end of link 56, the linkage system 50 and more particularly, links 54 and 56, have assumed an overcenter or locked condition relative to each other and the movable element 36 (FIG. 1) of each discharge mechanism is in a closed position. Of course, linkage system 50 preferably includes suitable and conventional cooperating instrumentalities allowing for adjustments of the operative length of each link 54, 56 to ensure proper operation of the lock.

In this particular design, linkage system 50 furthermore includes a stop for limiting movement of the element toward its open position. To move element 36 of each discharge mechanism 32, 34 from the closed position, shaft 42 is rotated, as shown in FIG. 7, in a counterclockwise direction with lever 54 moving therewith. As will be appreciated from FIG. 7, rotation of the operating shaft 42 in a counterclockwise direction can continue until edge portion 62c of lever 54 engages with bight portion 58" of the clevis-like configuration at the end of the link 56. As such, further counterclockwise rotation of lever 54 and, thus, operating shaft 42 is halted by the abutting relationship of edge portion 62c on lever 54 against the clevis-like configuration at the end of link 56. As shown, edge portion 62c is configured such that when abutment occurs between edge portion 62c on lever 54 and link 56, element 36 of each discharge mechanism is opened to allow the gravitational discharge of material from the hopper 12.

The end of the operating shaft 42, disposed proximate to the side 14/16 of the hopper 12, preferably allows for manual rotation of operating shaft 42. The end of the operating shaft 42 disposed for manual rotation is preferably provided with an operating handle 53 configured to releasably accommodate a conventional opening bar (not shown) for rotating the operating shaft 42 and thereby allowing the element 36 of each discharge mechanism to be manually moved between closed and open positions. Of course, the specific design embodied at the end of the operating shaft 42 to facilitate manual rotation of shaft 42 can be other than that shown without detracting or departing from the spirit an scope of this invention disclosure.

Figure 8:
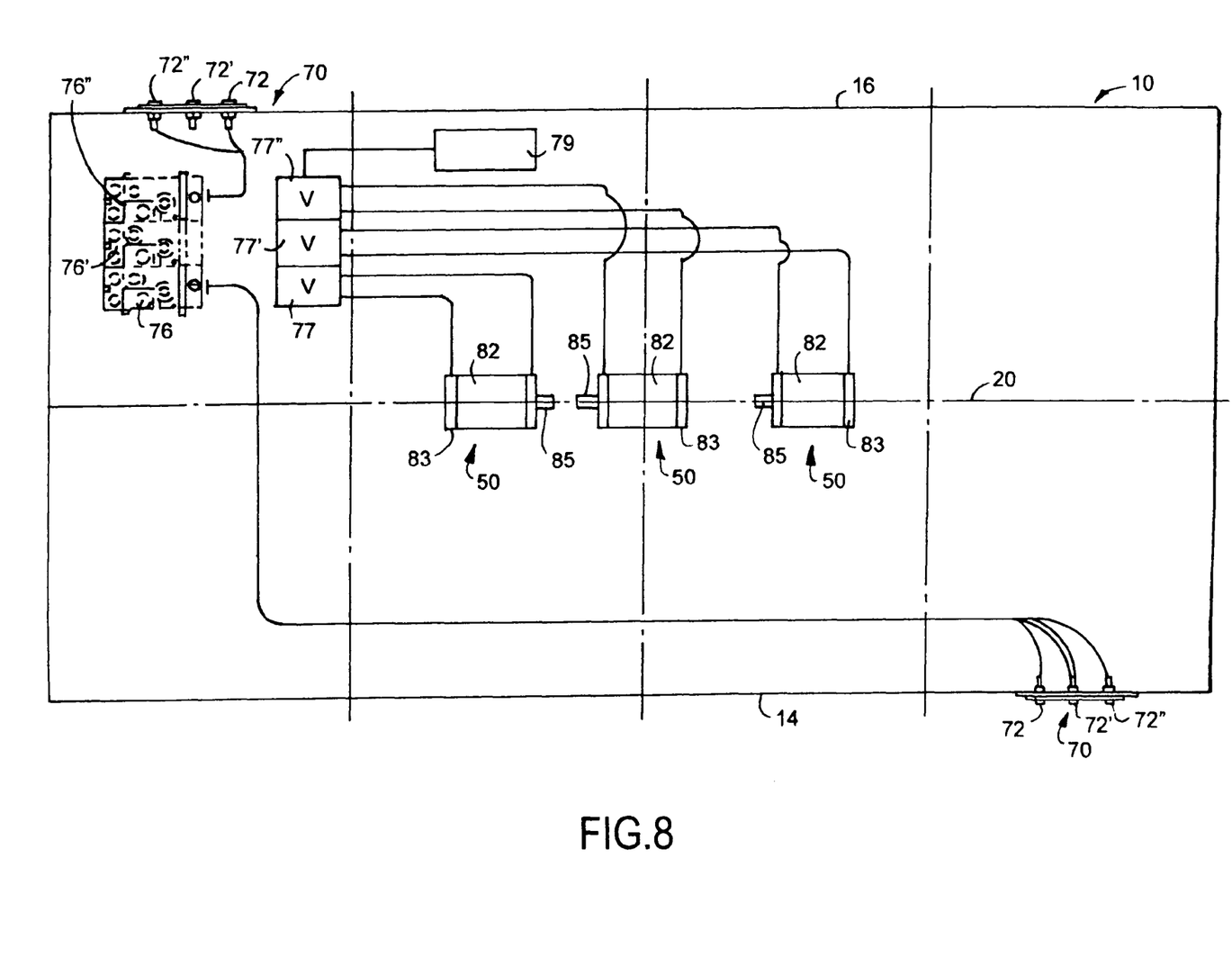
FIGS. 8 through 10 are schematic representations of various forms of electrical circuitry which can be used in combination with the present invention disclosure

As an alternative to manual operation, the element 36 of each discharge mechanism 32, 34 can be positively driven between closed and open positions. As shown in FIGS. 1 and 8, an electrically operated touch pad assembly 70 is conveniently and preferably located on each side of car 10 to allow for selectively powered movement of the element 36 of each discharge mechanism 32, 34 between closed and open positions. In the form shown in FIG. 1, touch pad assembly 70 includes three electrical contacts or buttons 72, 72' and 72" and an elongated electrical pad 74 for individually operating the discharge mechanism associated with each chute 26 of the hopper 12. Of course, if hopper 12 is provided with a greater or lesser number of chutes 26 than three, touch pad assembly 70 would be reconfigured accordingly.

One form of an electrical circuit associated with the touch pad assembly 70 is schematically represented in FIG. 8. Selectively connecting any one of the contacts 72, 72' and 72" in combination with the pad 74 to an electrical supply source controls operation of solenoids 76, 76' and 76" carried on the car 10. As will be appreciated, each solenoid 76, 76' and 76"

is operably associated with conventional valve structure including valves 77, 77' and 77", respectively, for directing power which, in the illustrated embodiment is air, from a suitable power source 79 to affect either powered opening or closing movements to the discharge mechanism associated with a particular chute 26 on the hopper 12.

In the illustrated embodiment, a drive mechanism 80 is operably connected to the linkage system 50 associated with each set of discharge mechanisms associated with each chute 12. In a preferred embodiment, and as shown in FIGS. 1 and 4, the drive mechanism 80 includes a powered driver 82 for selectively operating the linkage system 50 to either simultaneously move the elements 36 of each discharge mechanism into their closed position or to simultaneously move the elements 36 of each discharge mechanism 32, 34 from their closed position toward an open position (illustrated in phantom lines in FIG. 1).

In a preferred form, the driver 82 for each control apparatus includes a linearly distendable motor, i.e., a pneumatically operated cylinder. In the illustrated embodiment, and through operation of one of the solenoids 76, 76' or 76" (FIG. 8), air is selectively introduced toward either: the fixed end, to positively distend and operably lengthen the driver 82; or, the free or operative end to cause the operative length of the driver 82 to positively retract, in length.

In the form shown for exemplary purposes, a lever 84 radially extends from and is secured at one end to the operating shaft 42 and is operably connected to the operative end of driver 82. As such, linear extension/retraction of the driver 82 results in rotation of the lever 84 about a predetermined path of travel and rotation of the operating shaft 42 about axis 44.

An indicator system 90 is mounted on the railcar 10 for providing a visual indication whether the lock for maintaining the movable element of each discharge mechanism on the hopper car is in either a locked or unlocked condition. Notably, the system 90 is capable of providing a visual indication observable by a person located either proximate to or remote from the hopper car 10 of a condition of the lock arranged in operable combination with the discharge mechanism. As explained hereinafter, system 90 is preferably operable in: an "operational" mode; a "rest" mode; and an "indicator" mode.

Figure 9:
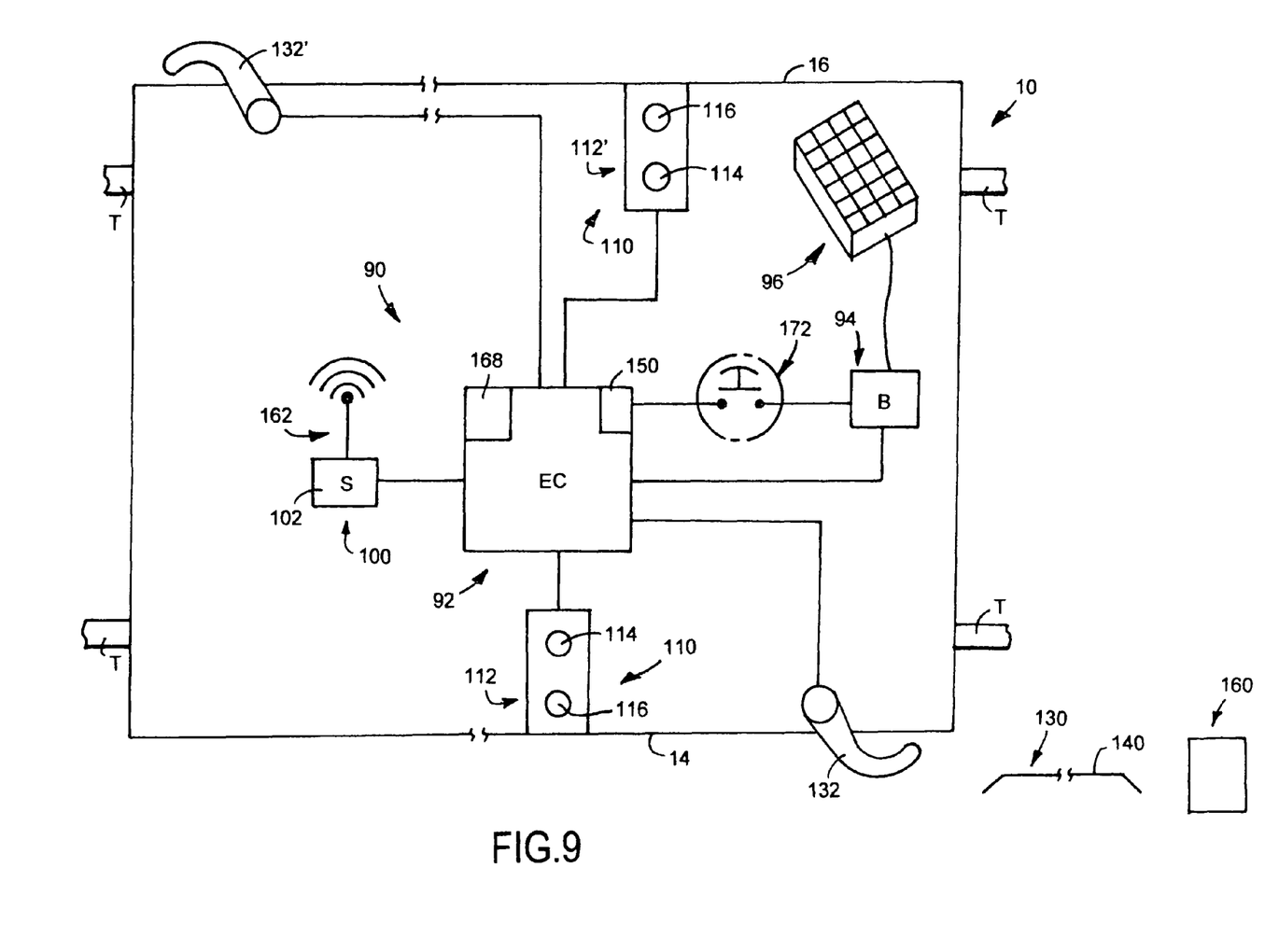

In the form shown in FIG. 9, the indicator system 90 includes electric circuitry, generally identified by reference numeral 92, connected to a power source 94 which, in the preferred embodiment, is a conventional rechargeable battery carried on car 10. In the illustrated embodiment, the power source 94 is connected to a solar energy panel 96 mounted on railcar 10. The electric circuitry 92 includes sensor technology 100 for monitoring the condition of the lock for each discharge mechanism and for controlling operation of an illuminable indicator 110 as a result of signals from the sensor technology 100 indicative of the condition of the lock for the railcar discharge mechanism. Although the indicator system 90 shown in FIG. 9 has been simplified, it is to be understood the indicator system 90 of the present disclosure monitors the condition of the lock—in whatever form or design selected for use—of each discharge mechanism—in whatever form or design selected for use—associated with each discharge opening—in whatever form or design selected for use—on the hopper 12.

The sensor technology 100 includes a sensor 102 which, as shown in FIG. 6, is mounted on railcar 10 by a suitable bracket or the like 101 for monitoring movement of a member of each discharge mechanism lock relative to a predetermined position. In a preferred form, and although only one sensor is illustrated in FIG. 9, the number of sensors used as part of or with the sensor technology 100 is equal to the number of discharge mechanism locks on the railcar 10. For example, if the railcar 10 was equipped with three discharge openings, the sensor technology would include three sensors 102; with one sensor monitoring movement of a member of each discharge mechanism lock relative to a predetermined position.

In the embodiment shown in FIGS. 5, 6 and 7, each sensor 102 is mounted on the railcar 10 for monitoring movement of a respective discharge mechanism lock member 54 relative to a predetermined position and for providing signals to the illuminable indicator 110 as a result of movement of the lock member relative to the predetermined position. In effect, each sensor 102 detects whether the respective discharge mechanism lock member 54 is in a position indicative of the lock being locked or unlocked. That is, each sensor 102 produces a first signal only when the lock for the associated railcar discharge mechanism is in one, i.e. locked, condition, and each sensor 102 produces a second signal only when the lock for the associated railcar discharge mechanism is in another, i.e. unlocked, condition. Of course, and particularly with different discharge mechanisms, the sensor 102 can be arranged to monitor movement of other members which move with the lock for the particular discharge mechanism. As such, any mental guessing by the operator of whether the lock is locked or unlocked is eliminated.

Preferably, sensor 102 is an inductive proximity switch of the type manufactured by Contrinex AG and sold under Model Number: DW-AS-713-M12. Of course, other types and/or models of sensors can be used in combination with system 90 without detracting or departing from the spirit and novel scope of this invention disclosure.

In one form, the illuminable indicator or display 110 for system 90 includes at least two illuminable displays 112 and 112' (FIG. 9) for visually indicating the conditions of each discharge mechanism lock on the rail car 10. In one form, the displays 112 and 112' are mounted on opposed sides of the railcar 10. As such, the condition of each discharge mechanism lock can be viewed from either side of the car 10 on display 112, 112'.

Alternatively, and with a relatively simple design change, the display 110 can include only one pair of illuminated displays 112, 112; with one display being arranged on each side of the car 10. In this alternative embodiment, the display 110 is operated as a collective function of signals delivered to the circuitry 92 by each sensor 102 operably associated with the lock operably associated with each discharge mechanism on the railcar 10. That is, if the lock operably associated with each discharge mechanism on the railcar 10 is in a locked condition, the display 110 would provide an illuminated visual indication that each discharge mechanism lock in a locked condition. On the other hand, and in this alternative embodiment, if any one or more of the locks on the plurality of discharge mechanisms was in an unlocked condition, and even though the remainder of the discharge mechanism locks were properly in the locked condition, the display 110 on the railcar would indicate at least one of the discharge mechanism locks was in an unlocked condition. Accordingly, and at a quick glance of the car 10 either proximate to or remote therefrom, an operator would be quickly alerted that at least one of the discharge mechanism locks required attention before allowing the car 10 to proceed between locations.

Preferably, the illuminable displays 112, 112' are identical relative to each other and, thus, only display 112 will be described in detail. Each display is electrically powered and controlled by signals from the sensor technology 100 to indicate whether the lock for the railcar discharge mechanism is in a locked or unlocked condition. In one form, the indicator or display 112 includes at least one light 114 operable in either of two states for indicating whether the lock for the railcar discharge mechanism is in a locked or unlocked condition. Preferably, however, and as shown in FIG. 9, each indicator or display 112 includes two lights 114 and 116. In this embodiment, light 114 emits illumination when the lock for the railcar discharge mechanism is in one condition, i.e. a locked condition, and with light 116 emitting illumination when the lock for the railcar discharge mechanism is in a different, i.e., unlocked condition. In one form, a first color, i.e., red, is emitted by each illuminable indicator or display 112, 112' when the first light 114 is illuminated, and wherein a second color, i.e., green, is emitted by each illuminable indicator or display 112, 112' when the second light 116 is illuminated.

An automated system, generally identified in FIG. 9 by reference numeral 130, is frequently arranged at a site wherein material is to be discharged from car 10. As shown in FIG. 8, and to affect powered operation of the discharge mechanism on car 10, conventional electrical contacts or pick-up shoes 132 and 132' can be mounted on and extend laterally past opposed sides 14 and 16 of railcar 10. The disposition of the shoes 132, 132' allows for automated operation of the discharge mechanisms regardless of the direction of car travel. Each shoe 132, 132' is electrically connected to the circuitry 92 of the indicator system 90.

As is known in the art, and at the material dump site, an electrified rail or other suitable electric conducting device 142 is arranged adjacent to the tracks T on which car 10 rides. When hopper car 10 moves toward the discharge site to exhaust material from car 10 and either shoe 132 or 132' contacts the electrified rail 142, the solenoids 76, 76' and 76" carried on the car 10 actuate the valves 77, 77' and 77" (FIG. 8) whereby directing power to each drive mechanism 80 on the car 10 to affect powered opening of each discharge mechanism on the car 10. As mentioned above, when the drive mechanism 80 of the discharge mechanism on hopper car 10 is activated, the lock maintaining the movable element of the discharge mechanism in a closed position is concurrently moved to permit the movable discharge element of each discharge mechanism to move toward an open position.

Preferably, the contact of either shoe 132, 132' with the electrical conducting device 142 also directs power to the indicator system 90 during an "operational mode" of the indicator system 90. As such, the movement of each lock member, i.e. lever 54, from a predetermined position is detected by the associated sensor technology 100 which directs an electrical signal to the illuminable indicator or display 110. Accordingly, the illuminable display 110 is controlled by the signal from the sensor technology 100 to provide a visual indication on each display 112, 112' showing the lock for each discharge mechanism has been moved to an unlocked condition.

As mentioned above, the illuminable display 110 is capable of visually showing the condition of the locks individually or collectively through any of several techniques. Notably, however, each technique used by display 110 involves the use of illumination or the lack thereof for indicating the condition of the discharge mechanism lock. The use of illumination in connection with the display 110 advantageously allows a person located either proximate to or remote from the railcar to quickly and easily access the condition of the railcar discharge mechanism locks simply by viewing the display 110. Of course, using illumination in connection with the display 110 to indicate the condition of the locks will furthermore quickly and readily permit evaluation of the condition of the locks regardless of the lighting conditions in which the hopper car happens to be so disposed.

When the hopper car discharging material has traveled sufficiently along the tracks and relative to the dump site or an operator disconnects the electrified rail 142 from the electrical power source, electrical power to the solenoids 76, 76' and 76" (FIG. 8) is removed. The loss or disconnection of electrical power to the shoe or electrical contact 123, 132', causes the solenoids 76, 76' and 76' to return the valves 77, 77' and 77" (FIG. 8) to their original state whereby returning the discharge mechanisms on the car 10, preferably under power, to a closed position.

When each discharge mechanism on hopper car 10 is returned to the closed position, the railcar discharge mechanism lock operably associated with the movable element of the respective discharge mechanism is likewise moved toward a locked condition to inhibit the movable discharge element of each mechanism from inadvertently moving toward an open position. In the illustrated embodiment, returning movement of the lock member, i.e. lever 54, to its predetermined position is detected by the sensor technology 100 which, only after each lock member 54 returns to that predetermined position wherein the railcar discharge mechanism is fully locked, directs an electrical signal to the display 110. Accordingly, the display 110 is controlled by the sensor technology 100 to provide a visual indication on the display 100 showing the lock for the discharge mechanism has been returned to a locked condition.

Notably, and following the loss of power to the indicator system or apparatus 90 from the electrified rail or other suitable electric conducting devices 142, and as the railcar 10 travels away from the discharge site, the illuminable indicator system 90 preferably continues to operate in the "operational mode". The independent power source 94 permits the illuminable display or indicator 110 to continue to operate and provide an illuminated indication of the condition of preferably each lock for each railcar discharge mechanism. Again, the use of illumination in connection with display 110 allows a person, located either proximate to or remote from the railcar, to quickly and easily access the condition of the lock simply by viewing the display 110.

In a preferred embodiment, and as shown in FIG. 9, the electrical circuitry 92 of the indicator system 90 is provided with a timer 150 for controlling the duration of the "operational mode". That is, the timer 150 controls the amount or length of time the display or indicator 110 is illuminated after each railcar discharge mechanism is operated by the drive mechanism 80 to move the discharge element of the mechanism between positions. Preferably, and to allow the power source 94 to maintain an adequate charge, the indicator 110 will remain operable during the "operational mode" only for a predetermined time period measured from the time each discharge mechanism on the railcar 10 is operated by the drive mechanism 80 to move the discharge element of the mechanism between its operable positions.

The ability of the display 110 to provide an illuminated indication of the condition of the lock for each discharge mechanism readily yields further advantages. That is, and as shown in FIG. 9, arranging a conventional reader or other suitable means 160 adjacent to the discharge site, the condition of the lock for each discharge mechanism on the hopper 12 can be viewed, recorded and maintained for further use as the hopper car 10 leaves the discharge site.

Alternatively, a transmitter 162 is preferably arranged in operable combination with the electric circuitry 92 for transmitting a signal indicative of the condition of the lock on each discharge mechanism. In the illustrated embodiment, a signal transmitter 162 is arranged in operable combination with the sensor technology 100 or other suitable component of the electric circuitry 92 for producing a signal indicative of the condition of the lock associated with each discharge mechanism in the car 10. As such, the condition of the lock associated with each railcar discharge mechanism can be determined from a location remote from the car 10 based on signals transmitted by transmitter 162. Upon expiration of the predetermined time set by timer 150, the illuminated system 90 preferably shifts or changes into a "rest" mode wherein the illuminable indicator 110 is not illuminated.

In a preferred form, the electrical circuitry 92 can further include a manually operated switch 172 in operable combination therewith. The purpose of switch 172 is to condition the indicator system 90 into an "indicator mode" of operation. That is, switch 172 connects the power source 94 to the electric circuitry 92 whereby enabling an operator, through manual operation of switch 172, to quickly and easily access the condition of the discharge mechanism locks on the car 10 whenever required or desired.

During operation of the indicator system 90, a problem can occur with any one or more of the following: the sensor technology 100; the illuminable indicator or display unit 110; or the lock on each discharge mechanism of car 10. Accordingly, the electric circuitry 92 furthermore preferably includes logic circuitry 168 for performing diagnostics relating to the components of the indicator system 90. Moreover, and in a preferred form, the logic circuitry 168 is capable of controlling the illuminable indicator or display unit 110 in such a manner or mode as to provide a visual indication on the display 110 of a problem with any one or more of the following: the sensor technology 100; the illuminable indicator or display unit 110; or the lock on each discharge mechanism of car 10.

Figure 10:
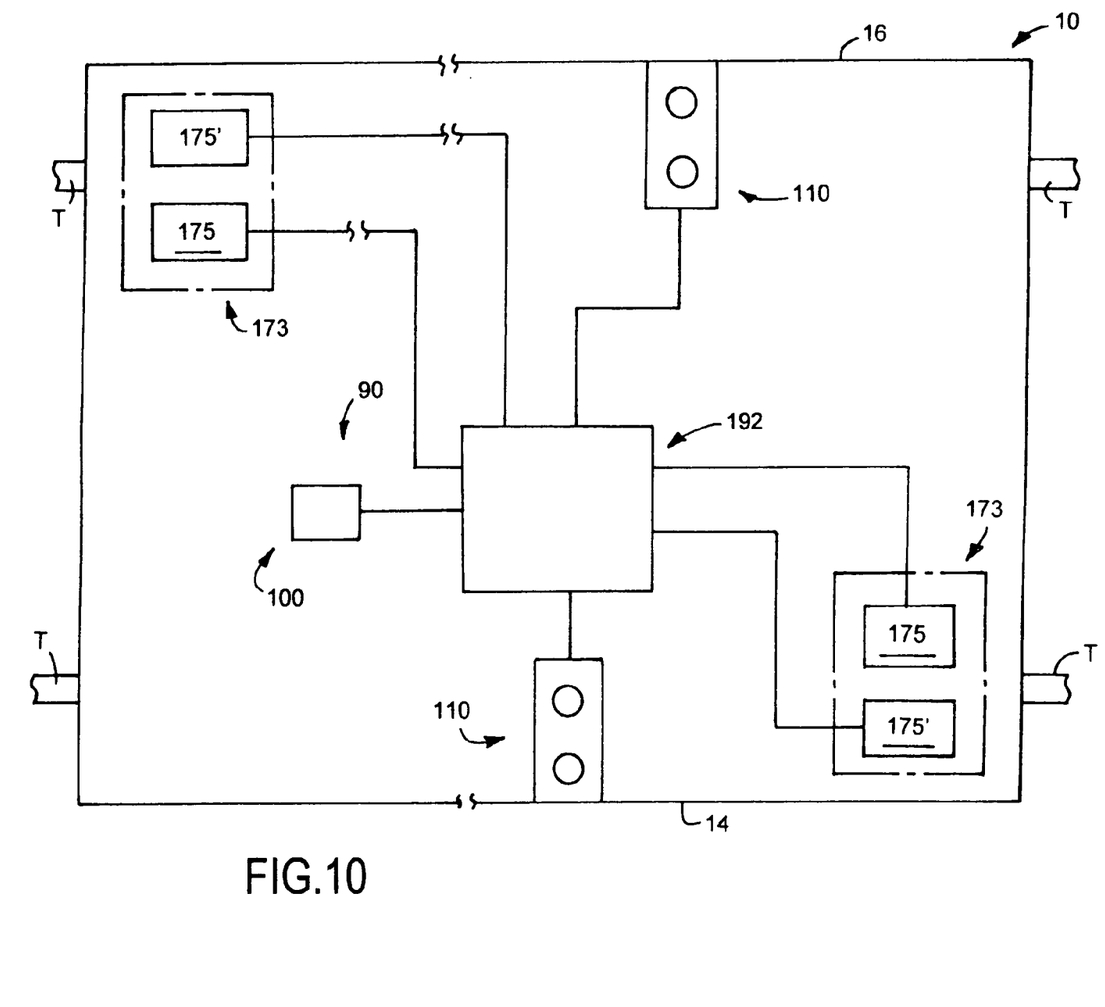

The indicator system 90 can also embody alternative electric circuitry, generally identified in FIG. 10, by reference numeral 192 for use in operable combination with the illuminable indicator 110. In the embodiment illustrated in FIG. 10, the illuminable indicator 110 is only operational in an "indicator" mode. That is, with the circuitry 192 illustrated in FIG. 10, the illuminable indicator 110 is only operational to visually indicate as a result of illumination, or lack thereof, whether the discharge mechanism lock is currently in a locked or unlocked condition for as long as electrical power is provided to the system 90.

In the embodiment illustrated in FIG. 10, an electrically operated touch pad assembly 173 is conveniently and preferably located on each side of car 10 to allow for selectively powered movement of the movable element of each discharge mechanism concurrently relative to each other between closed and open positions. In the form shown in FIG. 10, each touch pad assembly 173 includes two electrical pads 175 and 175'. Each electric pad 175, 175' is electrically connected to the electric circuitry 192 of the indicator system 90. As discussed above, the indicator system 90 furthermore includes the sensor technology 100 for detecting and monitoring whether the lock operably associated with each discharge mechanism is in a locked condition or an unlocked condition.

In the embodiment illustrated in FIG. 10, when electric power is provided to either contact 175, 175', power is likewise provided to the electric circuit 192 and to the sensor technology 100. If so desired, such electrical power can be provided to the contacts 175, 175' through any suitable and conventional and preferably portable hand held apparatus. The sensor technology 100 likewise receives power delivered to the contacts 175, 175' and operates the illuminable indicator 110 as a function of the predetermined position of the respective lock members, i.e., levers 54 relative thereto, and provides an illuminated indication of the condition of the discharge mechanism lock as long as electric power is provided to either electrical contact 175, 175'.

From the foregoing, it will be observed that numerous modifications and variations can be made and effected without departing or detracting from the true spirit and novel concept of this invention disclosure. Moreover, it will be appreciated, the present disclosure is intended to set forth exemplifications which are not intended to limit the disclosure to the specific embodiments illustrated. Rather, this disclosure is intended to cover by the appended claims all such modifications and variations as fall within the spirit and scope of the claims.

What is claimed is:

1. In combination with a railroad car with a hopper from which material can be discharged, a door movable between open and closed positions relative to a discharge opening defined by said hopper, a linkage mechanism connected to and for controlling movement of said door between the open and the closed positions and thereby controlling the discharge of material from said hopper, a lock including an over-center design connected to said door, with said lock being operable in either a locked condition, wherein said lock maintains the door in the closed position whereby inhibiting discharge of material from the hopper, and an unlocked condition, wherein said lock permits the door to be moved from the closed position toward the open position whereby permitting the discharge of material from the hopper, with said mechanism including a member movable in a predetermined path of travel as said lock moves between conditions, and a system for visually indicating the condition of said lock, said system comprising:

an electrically powered illuminable indicator arranged on a side of the hopper for indicating whether said over-center lock is in said locked condition or said unlocked condition; and circuitry connected to said illuminable indicator, said circuitry including sensor technology for monitoring the condition of said over-center lock and for controlling the operation of said illuminable indicator as a result of signals from said sensor technology indicative of the condition of said over-center lock.

2. The system for visually indicating the condition of said lock according to claim 1, wherein the mechanism on said railroad car is operated by a driver to move the door between the closed position and the open position, and wherein the electric circuitry of said system for visually indicating the condition of said lock is powered for a preset time after said mechanism is operated by said driver to move the door relative to the discharge opening.

3. The system for visually indicating the condition of said lock according to claim 1, wherein said sensor technology includes a senor mounted on said railroad car for monitoring movement of the member of said mechanism relative to a predetermined position and for providing a signal to said illuminable indicator when the member of said mechanism moves relative to said predetermined position.

4. The system for visually indicating the condition of said lock according to claim 1, wherein a solar energy panel mounted on said car powers a battery connected to said illuminable indicator and the circuitry of said system for visually indicating the condition of said lock.

5. The system for visually indicating the condition of said lock according to claim 1, wherein said illuminable indicator includes a light operable in either of two modes for indicating whether said over-center lock is in said locked condition or said unlocked condition.

6. The system for visually indicating the condition of said lock according to claim 1, wherein said illuminable indicator includes two lights, with one light emitting illumination when said over-center lock is in said locked condition, and with a second light emitting illumination when said over-center lock in an unlocked condition.

7. The system for visually indicating the condition of said lock according to claim 6, wherein a first color is emitted by said illuminable indicator when said one light is illuminated, and wherein a second color, different from said first color, is emitted by said illuminable indicator when said second light is illuminated.

8. A system mounted on a railroad hopper car for providing a visual indication observable by a person located either proximate to or remote from the hopper car of a condition of a lock including an over-center design, with said lock being connected to a door on the hopper car used to control the discharge of material from said hopper car through a linkage mechanism, with said linkage mechanism including an element movable in a predetermined path of travel as the door on said hopper car is moved by said mechanism between a closed position and an open position, said system comprising:
  circuitry connected to an electrical power source and including a sensor for providing a first signal when said over-center lock is in a locked condition, wherein the door on said hopper car is maintained in the closed position, and for producing a second signal when said over-center lock is in an unlocked condition, wherein the door on said hopper car is permitted to be moved to the open position; and
  an illuminable indicator mounted to a side of the railroad hopper car and responsive to signals from said circuitry for displaying the condition of said lock viewable from a location proximate to said railroad hopper car or from a location remote from said railroad hopper car.

9. The system according to claim 8, wherein said sensor is mounted on said railroad car for monitoring movement of the element of said mechanism relative to a predetermined position and for providing a signal to said illuminable indicator when the element of said mechanism moves relative to said predetermined position.

10. The system according to claim 8, wherein the electrical power source connected to said electrical circuitry includes a solar energy panel mounted on said railroad car.

11. The system according to claim 8, wherein the mechanism on said railroad car is operated by a driver to move the door on said hopper car between the closed position and the open position, and wherein the electric circuitry of said system is powered for a preset time after said mechanism is operated by said driver to move the door on said hopper car.

12. A system mounted on a railroad hopper car for providing a visual indication observable by a person located either proximate to or remote from the hopper car of a condition of a lock arranged in operable combination with a mechanism on the hopper car used to control discharge of material from said hopper car, a door on said hopper car movable between a closed position and an open position, and with said mechanism including a member movable in a predetermined path of travel as said door moves between positions, said system comprising:
  circuitry connected to an electrical power source and including a sensor for providing a first signal when said lock is in the locked condition, wherein the door on said hopper car is maintained in the closed position, and for producing a second signal when said lock is in an unlocked condition, wherein the door on said hopper car is permitted to be moved to the open position;
  an illuminable indicator mounted to a side of the railroad hopper car and responsive to signals from said circuitry for displaying the condition of said lock viewable from a location proximate to said railroad hopper car or from a location remote from said railroad hopper car; and
  logic circuitry for controlling said illuminable indicator to provide a visual indication of a fault with either said system or said lock or both.

13. The system according to claim 8, wherein said illuminable indicator includes a light operable in either of two modes for indicating whether said lock is in said locked condition or said unlocked condition.

14. The system according to claim 8, wherein said illuminable indicator includes two lights, with one light emitting illumination when said lock is in said locked condition, and with a second light emitting illumination when said lock in an unlocked condition.

15. The system according to claim 14, wherein a first color is emitted by said illuminable indicator when said one light is illuminated, and wherein a second color, different from said first color, is emitted by said illuminable indicator when said second light is illuminated.

16. A system mounted on a railroad hopper car for providing a visual indication observable by a person located either proximate to or remote from the hopper car of a condition of a lock including an over-center design connected to a door on the hopper car used for controlling discharge of material from said hopper car through a linkage mechanism, with said linkage mechanism including an element movable in a predetermined path of travel as the door on said hopper car is moved by said mechanism between a closed position and an open position, said system comprising:
  a sensor mounted on the hopper car for monitoring and detecting when said over-center lock is in the locked condition, wherein the door on said hopper car is maintained in the closed position, and for detecting when said over-center lock is in the unlocked condition, wherein the door on said hopper car is permitted to be moved to the open position; and
  an electronically powered display mounted to a side of the railroad hopper car and controlled by said sensor wherein, said sensor, upon detecting said over-center lock to be in said locked condition activates said display to visually indicate said over-center lock to be in the locked condition and upon detecting said lock to be in the unlocked condition activates said display to indicate said lock is in the unlocked condition.

17. The system according to claim 16, wherein said sensor is mounted on said railroad car for monitoring movement of the element of said mechanism relative to a predetermined position and for providing signals to said display when the element of said mechanism moves relative to said predetermined position.

18. The system according to claim 16 further including a solar energy panel mounted on said railroad car and connected to said sensor and said electronically powered display.

19. The system according to claim 16, wherein the mechanism on said railroad car is operated by a driver to operably move the door on said hopper car between the closed position and the open position, and wherein the electric circuitry of said system is powered for a preset time after said mechanism is operated by said driver to move the door on said hopper car.

20. A system mounted on a railroad hopper car for providing a visual indication observable by a person located either proximate to or remote from the hopper car of a condition of a lock arranged in operable combination with a mechanism on the hopper car for controlling discharge of material from said hopper car, a door mounted on said hopper car for movement between a closed position and an open position, said system comprising:
- a sensor mounted on the hopper car for monitoring and detecting when said lock is in the locked condition, wherein the door on said hopper car is maintained in the closed position, and for detecting when said lock is in the unlocked condition, wherein the door on said hopper car is permitted to be moved to the open position;
- an electronically powered display mounted to a side of the railroad hopper car and controlled by said sensor wherein, said sensor, upon detecting said lock to be in said locked condition activates said display to visually indicate said lock to be in the locked condition and upon detecting said lock to be in the unlocked condition activates said display to indicate said lock is in the unlocked condition; and
- logic circuitry for controlling said display to provide a visual indication of a fault with either said system or said lock or both.

21. The system according to claim 16, wherein said display includes a light operable in either of two modes for indicating whether said lock is in said locked condition or said unlocked condition.

22. The system according to claim 16, wherein said display includes two lights, with one light emitting illumination when said lock is in said locked condition, and with a second light emitting illumination when said lock in an unlocked condition.

23. The system according to claim 22, wherein a first color is emitted by said display when said one light is illuminated, and wherein a second color, different from said first color, is emitted by said display when said second light is illuminated.

24. A method for visually indicating a condition of a lock on a railroad hopper car having multiple sides to a person located either proximate to or remote from the railroad hopper car, with said lock including an over-center design and is connected to a door on the railroad hopper car through a linkage mechanism, with said door being movable relative to a discharge opening defined by the railroad hopper car between an open position and a closed position for controlling discharge of material from said hopper car, and with said linkage mechanism including an element movable between a first position and an second position in response to movement of said door between said closed position and said open position, said method comprising the steps of:
- sensing whether said over-center lock is in the locked condition, wherein the door on said hopper cars is maintained in the closed position, or in the unlocked condition, wherein permitting the door on said hopper car to be moved toward the open position;
- transmitting information relating to the condition of said lock; and
- displaying information relating to the condition of said lock with an illuminable indicator mounted to a side of said railroad hopper car.

25. The method according to claim 24, wherein the mechanism on said railroad car is operated by a driver to move the door on said hopper car between the closed position and the open position, and wherein the method further includes the step of: illuminating said indicator for a preset time after said mechanism is operated by said driver to move the door on said hopper car.

26. The method according to claim 24 further including the step of: providing electrical power to said illuminable indicator from a solar energy panel mounted on said railroad car.

27. The method according to claim 24 further including the step of: reading the information displayed by said illuminable indicator on the side of said railroad car.

28. The method according to claim 24 further including the step of:
- transmitting data to a location remote from said railroad hopper car based upon the condition of said lock.

29. A method for visually indicating a condition of a lock on a railroad hopper car having multiple sides to a person located either proximate to or remote from the railroad hopper car, with said lock being arranged in operable combination with a mechanism on the railroad hopper car for controlling discharge of material from said hopper car, a door on said hopper car movable between a closed position and an open position, and with said mechanism including a member movable in a predetermined path of travel as said door moves between positions, said method comprising the steps of:
- sensing whether said lock is in the locked condition, wherein the door on said hopper car maintained in the closed position, or in the unlocked condition, wherein permitting the door on said hopper car to be moved toward the open position;
- transmitting information relating to the condition of said lock;
- displaying information relating to the condition of said lock with an illuminable indicator mounted to a side of said railroad hopper car; and
- using logic circuitry to control said illuminable indicator in a manner displaying a fault with either said lock or said sensor.

30. The method according to claim 24, wherein said illuminable indicator includes a light operable in either of two modes for indicating whether said lock is in said locked condition or said unlocked condition.

31. The method according to claim 24, wherein said illuminable indicator includes two lights, with one light emitting illumination when said lock is in said locked condition, and with a second light emitting illumination when said lock in an unlocked condition.

32. The method according to claim 31, wherein a first color is emitted by said illuminable indicator when said one light is illuminated, and wherein a second color, different from said first color, is emitted by said illuminable indicator when said second light is illuminated.

* * * * *